(12) United States Patent
Sole Rojals et al.

(10) Patent No.: US 10,200,690 B2
(45) Date of Patent: Feb. 5, 2019

(54) VIDEO DECODER CONFORMANCE FOR HIGH DYNAMIC RANGE (HDR) VIDEO CODING USING A CORE VIDEO STANDARD

(71) Applicant: QUALCOMM Incorporated, San Diego, CA (US)

(72) Inventors: Joel Sole Rojals, San Diego, CA (US); Adarsh Krishnan Ramasubramonian, San Diego, CA (US); Dmytro Rusanovskyy, San Diego, CA (US); Sungwon Lee, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 15/272,172

(22) Filed: Sep. 21, 2016

(65) Prior Publication Data

US 2017/0085878 A1 Mar. 23, 2017

Related U.S. Application Data

(60) Provisional application No. 62/222,147, filed on Sep. 22, 2015.

(51) Int. Cl.
*H04N 19/124* (2014.01)
*H04N 19/98* (2014.01)
(Continued)

(52) U.S. Cl.
CPC ......... *H04N 19/124* (2014.11); *G06F 3/1407* (2013.01); *G06T 5/007* (2013.01);
(Continued)

(58) Field of Classification Search
CPC ...... H04N 19/124; H04N 19/98; H04N 19/44; H04N 19/18; H04N 19/186
(Continued)

(56) References Cited

U.S. PATENT DOCUMENTS

| 8,248,486 B1 * | 8/2012 | Ward | H04N 9/67 |
| | | | 348/222.1 |
| 2013/0083838 A1 * | 4/2013 | Touze | H04N 5/2355 |
| | | | 375/240.01 |

(Continued)

FOREIGN PATENT DOCUMENTS

WO 2015007505 A1 1/2015

OTHER PUBLICATIONS

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

(Continued)

*Primary Examiner* — Tung T Vo
(74) *Attorney, Agent, or Firm* — Shumaker & Sieffert, P.A.

(57) ABSTRACT

In one example, a device for processing decoded video data a video decoder implemented by one or more hardware-based processing units comprising digital logic circuitry, and a postprocessing unit implemented by one or more hardware-based processing units comprising digital logic circuitry. The video decoder is configured to decode video data of a video bitstream according to a video coding standard, extract HDR postprocessing data from an SEI message of the video bitstream, and provide the decoded video data and the HDR postprocessing data to the postprocessing unit. The postprocessing unit is configured to process the decoded video data using the HDR postprocessing data according to the video coding standard. The device may additionally determine whether the video decoder is compliant with the video coding standard by comparing the processed video data with reference processed video data.

24 Claims, 10 Drawing Sheets

(51) Int. Cl.
| | |
|---|---|
| *H04N 19/44* | (2014.01) |
| *H04N 19/18* | (2014.01) |
| *H04N 19/186* | (2014.01) |
| *H04N 19/70* | (2014.01) |
| *H04N 19/46* | (2014.01) |
| *H04N 19/30* | (2014.01) |
| *H04N 19/85* | (2014.01) |
| *G06F 3/14* | (2006.01) |
| *G09G 5/04* | (2006.01) |
| *G06T 5/00* | (2006.01) |
| *H04N 19/126* | (2014.01) |
| *G09G 3/00* | (2006.01) |
| *G09G 5/06* | (2006.01) |

(52) U.S. Cl.
CPC .............. *G09G 5/04* (2013.01); *H04N 19/18* (2014.11); *H04N 19/186* (2014.11); *H04N 19/30* (2014.11); *H04N 19/44* (2014.11); *H04N 19/46* (2014.11); *H04N 19/70* (2014.11); *H04N 19/85* (2014.11); *H04N 19/98* (2014.11); *G09G 3/003* (2013.01); *G09G 5/06* (2013.01); *G09G 2320/0276* (2013.01); *G09G 2340/06* (2013.01); *G09G 2370/00* (2013.01)

(58) Field of Classification Search
USPC ..................................................... 375/240.26
See application file for complete search history.

(56) References Cited

U.S. PATENT DOCUMENTS

| | | | | |
|---|---|---|---|---|
| 2015/0312578 | A1* | 10/2015 | Sato ....................... | H04N 19/70 375/240.02 |
| 2016/0100183 | A1* | 4/2016 | Yamamoto ............... | H04N 5/76 386/230 |
| 2016/0134832 | A1* | 5/2016 | Yamamoto ............. | H04N 19/70 386/248 |
| 2016/0232937 | A1* | 8/2016 | Yamamoto ............... | H04N 5/76 |
| 2016/0373712 | A1* | 12/2016 | Yamamoto ............. | G11B 20/10 |
| 2017/0026646 | A1* | 1/2017 | Minoo ................. | H04N 19/124 |
| 2017/0251211 | A1* | 8/2017 | Froehlich ............. | H04N 19/124 |
| 2017/0374313 | A1* | 12/2017 | Oh ......................... | H04N 7/015 |
| 2018/0007363 | A1* | 1/2018 | Oh ....................... | H04N 21/235 |
| 2018/0213259 | A1* | 7/2018 | Francois ................ | H04N 19/70 |

OTHER PUBLICATIONS

ITU-T H.265, Series H: Audiovisual and Multimedia SystemsInfrastructure of audiovisual services—Coding of moving video, , Advanced video coding for generic audiovisual services, The International Telecommunication Union. Apr. 2015, 634 pp.

"High Dynamic Range Electro-Optical Transfer Function of Mastering Reference Displays," SMPTE ST 2084:2014; SMPTE Standard, Aug. 16, 2014, 14 pp.

"Parameter values for the HDTV standards for production and international programme exchange," Recommendation ITU-R BT.709-6, International Telecommunication Union, Jun. 2015, 19 pp.

"Parameter values for ultra-high definition television systems for production and international programme exchange," Recommendation ITU-R BT.2020-2, International Telecommunication Union, Oct. 2015, 8 pp.

"Parameter values for the HDTV standards for production and international programme exchange," Recommendation ITU-R BT.709-5, International Telecommunication Union, Apr. 2002, 32 pp.

Sansli, et al., "Dynamic range adjustment SEI message," m36330, Jun. 19-26, 2015, (Joint Collaborative Team on Video Coding of ISO/IEC JTC1/SC29/WG11 and ITU-T SG.16); MPEG meeting, Jun. 26, 2015, No. JCTVC-U0098, 5 pp.

SMPTE Recommended Practice, 4:2:2 / 4:2:0 Format Conversion Minimizing Color Difference Signal Degradation in Concatenated Operations—Filtering, SMPTE RP 2050-1:2012, Jan. 30, 2012, 11 pp.

Standard: SMPTE 231-1, for Motion-Picture Film (8-mm Type R)—Camera Aperture Image and Usage, Nov. 8, 2004, 4 pp.

"IEEE Standard Specifications for the Implementations of 8×8 Inverse Discrete Cosine Transform," IEEE Std. 1180-1990, Dec. 6, 1990, 12 pp.

"IEEE Standard for Floating-Point Arithmetic," IEEE Computer Society, IEEE Std 754-2008, Aug. 29, 2008, 70 pp.

"Digital Video Broadcasting (DVB); Plano-stereoscopic 3DTV; Part 2: Frame Compatible Plano-stereoscopic 3DTV," ETSI TS 101 547-2, V1.2.1, Nov. 2012, 26 pp.

"Digital Video Broadcasting (DVB); Specification for the use of Video and Audio Coding in Broadcasting Applications based on the MPEG-2 Transport Stream," ETSI TS 101 154 v1.11.1, Nov. 2012, 195 pp.

Fogg, "SEI Comments", MovieLabs, JCT-VC of ITU-T SG 16 WP 3 and ISO/IEC JTC1/SC29/WG11, 18th Meeting, Sapporo, JP, Jun. 30-Jul. 9, 2014, JCTVC-R0217, Jun. 21, 2014, 15 pp.

Goris, et al., "Philips Response to CfE for HDR and WCG", Philips, ISO/IEC JTC1/SC29/WG11 MPEG2015/M36266, Jun. 23, 2015, 16 pp.

Invitation to Pay Additional Fees and Partial Search Report from International Application No. PCT/US2016/053143, dated Dec. 20, 2016, 8 pp.

* cited by examiner

VIDEO DECODER CONFORMANCE FOR HIGH DYNAMIC RANGE (HDR) VIDEO CODING USING A CORE VIDEO STANDARD

This application claims the benefit of U.S. Provisional Application No. 62/222,147, filed Sep. 22, 2015, the entire content of which is hereby incorporated by reference.

TECHNICAL FIELD

This Disclosure Relates to Video Processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques that may be used to determine whether a video decoder conforms to a video coding standard. Moreover, the techniques of this disclosure may generally be used to process decoded video data to prepare high dynamic range (HDR) video data. Decoded video data may be postprocessed to form HDR video data in a variety of ways. For example, a client device may upsample chrominance data of the decoded video data, e.g., from a 4:2:0 format to a 4:4:4 format. The client device may additionally or alternatively inverse quantize the decoded video data to achieve a higher bit depth. The client device may additionally or alternatively convert the decoded video data to a different color space, e.g., from a luminance and chrominance color space (such as YUV or Y'CbCr) to a red-green-blue (RGB) color space. The client device may additionally or alternatively perform an electro-optical transfer function on the decoded video data, to produce high dynamic range (HDR) video data. In accordance with the techniques of this disclosure, any or all of these postprocessing procedures may be controlled using syntax elements of the coded video bitstream, such as a supplemental enhancement information (SEI) message. Thus, the video decoder may extract HDR postprocessing data from the SEI message and provide the extracted postprocessing data to one or more post processing units. Furthermore, conformance with a video coding standard may be tested following any or all of the postprocessing procedures, e.g., any of the various postprocessing procedures discussed above.

In one example, a method of processing decoded video data includes decoding, by a video decoder, video data of a video bitstream according to a video coding standard, the video bitstream including a supplemental enhancement information (SEI) message including high dynamic range (HDR) postprocessing data for the decoded video data, extracting, by the video decoder, the HDR postprocessing data from the SEI message, providing, by the video decoder, the decoded video data and the HDR postprocessing data to a postprocessing unit, and processing, by the postprocessing unit, the decoded video data using the HDR postprocessing data according to the video coding standard.

In another example, a device for processing decoded video data includes a memory configured to store video data of a video bitstream, the video bitstream including a supplemental enhancement information (SEI) message including high dynamic range (HDR) postprocessing data for the decoded video data; a video decoder implemented by one or more hardware-based processing units comprising digital logic circuitry; and a postprocessing unit implemented by one or more hardware-based processing units comprising digital logic circuitry. The video decoder is configured to decode the video data according to a video coding standard, extract the HDR postprocessing data from the SEI message, and provide the decoded video data and the HDR postprocessing data to the postprocessing unit. The postprocessing unit is configured to process the decoded video data using the HDR postprocessing data according to the video coding standard.

In another example, a device for processing decoded video data includes means for decoding video data of a video bitstream according to a video coding standard, the video bitstream including a supplemental enhancement information (SEI) message including high dynamic range (HDR) postprocessing data for the decoded video data, means for extracting the HDR postprocessing data from the SEI message, means for providing the decoded video data and the HDR postprocessing data to postprocessing means, and the postprocessing means for processing the decoded video data using the HDR postprocessing data according to the video coding standard.

In another example, a computer-readable storage medium has stored thereon instructions that, when executed, cause first one or more processors executing a video decoder to decode video data of a video bitstream according to a video coding standard, the video bitstream including a supplemental enhancement information (SEI) message including high dynamic range (HDR) postprocessing data for the decoded video data, extract the HDR postprocessing data from the SEI message, and provide, by the video decoder, the decoded video data and the HDR postprocessing data to a postprocessing unit executed by second one or more processors, and cause the second one or more processors executing the postprocessing unit to process the decoded video data using the HDR postprocessing data according to the video coding standard.

The details of one or more examples are set forth in the accompanying drawings and the description below. Other features, objects, and advantages will be apparent from the description and drawings, and from the claims.

DETAILED DESCRIPTION

This disclosure describes several techniques related to pre-processing and postprocessing high dynamic range (HDR) and/or wide color gamut (WCG) video data. In some examples, this disclosure describes techniques for processing HDR/WCG video data in accordance with a standard video coded (encoder/decoder).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, the design of a new video coding standard, namely ITU-T H.265, HEVC, has been finalized by the Joint Collaboration Team on Video Coding (JCT-VC) of ITU-T Video Coding Experts Group (VCEG) and ISO/IEC Motion Picture Experts Group (MPEG). The ITU-T HEVC standard is available as ITU-T H.265: High Efficiency Video Coding (HEVC), available at www.itu.int/rec/T-REC-H.265-201504-I/en. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2015.

The techniques of this disclosure may be applicable to a variety of video coding standards, including but not limited to ITU-T H.264/AVC, ITU-T H.265/HEVC, and other standards that are involved in HDR video. The techniques of this disclosure may be used to determine compliance with these or future video coding standards, or extensions to such standards.

Figure 1:
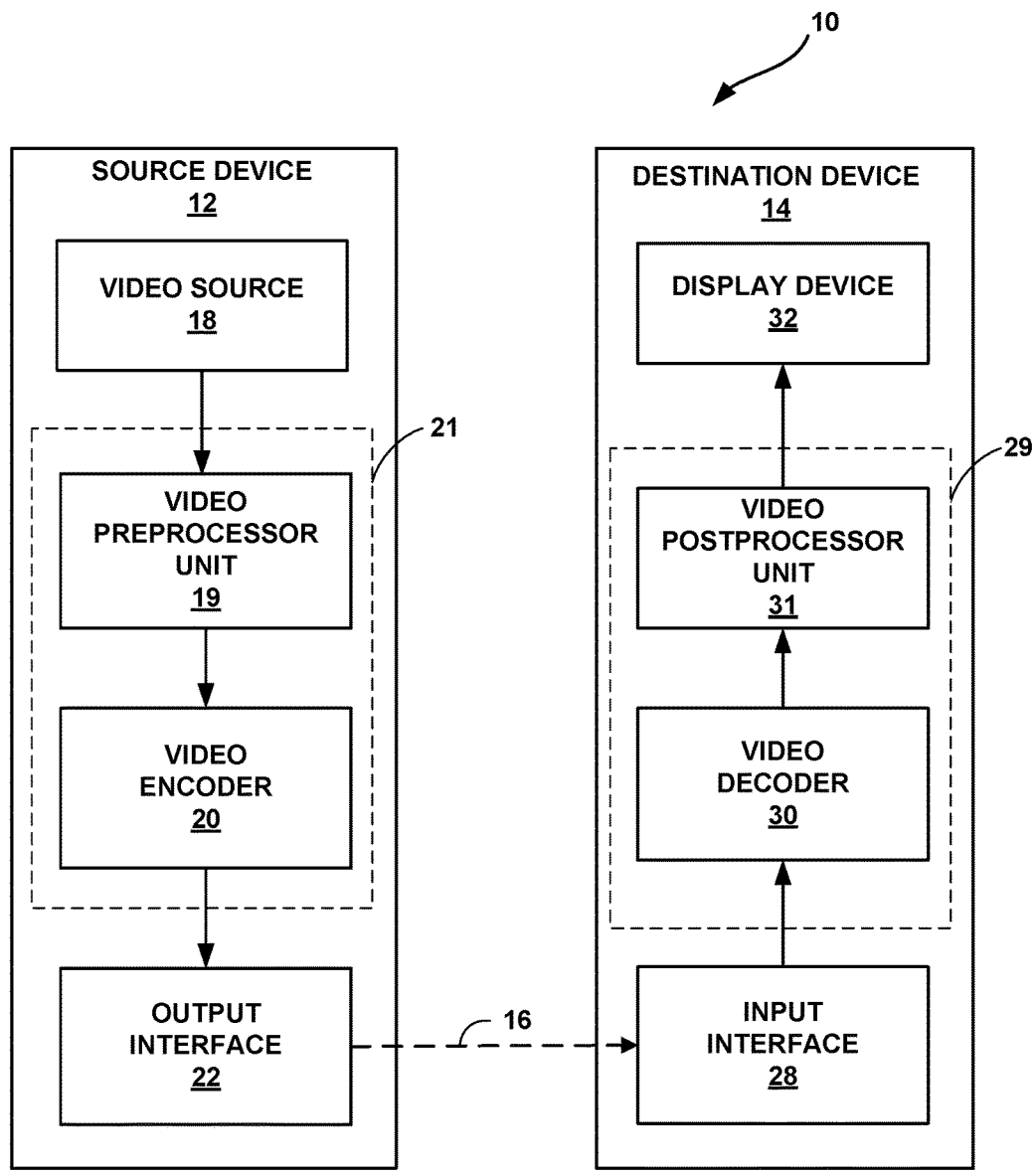
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoding unit 21, which includes video preprocessor unit 19 and video encoder 20, and output interface 22. Destination device 14 includes input interface 28, video decoding unit 29, which includes video decoder 30 and video postprocessor unit 31, and display device 32. Video preprocessor unit 19 and video postprocessor unit 31 may be configured to apply portions of one or more example techniques as described in this disclosure. In other examples, a source device and a destination device may include other components or arrangements. For example, source device 12 may receive video data from an external video source 18, such as an external camera. Likewise, destination device 14 may interface with an external display device, rather than including an integrated display device.

In accordance with the techniques of this disclosure, as discussed in greater detail below, video decoder 30 may receive a bitstream including coded video data and one or more supplemental enhancement information (SEI) messages including high dynamic range (HDR) postprocessing data. The HDR postprocessing data may include, for example, data for upsampling 4:2:0 chroma format data to a 4:4:4 chroma format, data for inverse quantizing samples to a full bit depth, data for converting video data in a luminance and chrominance (e.g., Y'CbCr) color space to a red-green-blue (RGB) color space, data for performing a transform function, or the like.

Video decoder 30 may extract HDR postprocessing data from the SEI message(s) and pass the HDR postprocessing data to video postprocessing unit 31. Video postprocessing unit 31, in turn, may prepare HDR video data from decoded video data received from video decoder 30. In this manner, the techniques of this disclosure may support HDR video data.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." For ease of description, the disclosure is described with respect to video preprocessor unit 19 and video postprocessor unit 31 performing the example techniques described in this disclosure in respective ones of source device 12 and destination device 14. Source device 12 and destination device 14 are merely examples of such coding devices in which source device 12 generates coded video data for transmission to destination device 14. In some examples, devices 12, 14 may operate in a substantially symmetrical or reciprocal manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoding unit 21. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20 of video encoding unit 21, which is also used by video decoder 30 of video decoding unit 29, that includes syntax elements that describe characteristics and/or processing of blocks and other coded units of video data. Display device 32 displays the decoded video data to a user, and may comprise any of a variety of display devices such as a liquid crystal display (LCD), a plasma display, an organic light emitting diode (OLED) display, or another type of display device.

As illustrated, video preprocessor unit 19 receives the video data from video source 18. Video preprocessor unit 19 may be configured to process the video data to convert it into a form that can is suitable for encoding with video encoder 20. For example, video preprocessor unit 19 may perform dynamic range compacting (e.g., using a non-linear transfer function), color conversion to a more compact or robust color space, and/or floating-to-integer representation conversion. Video encoder 20 may perform video encoding on the video data outputted by video preprocessor unit 19. Video decoder 30 may perform the inverse of video encoder 20 to decode video data, and video postprocessor unit 31 may perform the inverse of video preprocessor unit 19 to convert the video data into a form suitable for display. For instance, video postprocessor unit 31 may perform integer-to-floating conversion, color conversion from the compact or robust color space, and/or the inverse of the dynamic range compacting to generate video data suitable for display.

Video encoding unit 21 and video decoding unit 29 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoding unit 21 and video decoding unit 29 may be included in one or more encoders or decoders, either of which may be integrated as part of a combined encoder/decoder (CODEC) in a respective device.

Although video preprocessor unit 19 and video encoder 20 are illustrated as being separate units within video encoding unit 21 and video postprocessor unit 31 and video decoder 30 are illustrated as being separate units within video decoding unit 29, the techniques described in this disclosure are not so limited. Video preprocessor unit 19 and video encoder 20 may be formed as a common device (e.g., integrated circuit or housed within the same chip). Similarly, video postprocessor unit 31 and video decoder 30 may be formed as a common device (e.g., integrated circuit or housed within the same chip).

Video encoder 20 and video decoder 30 operate according to a video compression standard, such as any of the video coding standards described above. In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of another picture.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Supplemental Enhancement Information (SEI) messages are included in video bitstreams, typically to carry information that are not essential in order to decode the bitstream by the decoder. This information is useful in improving the display or processing of the decoded output; e.g., such information could be used by decoder-side entities to improve the viewability of the content. It is also possible that certain application standards could mandate the presence of such SEI messages in the bitstream so that the improvement in quality can be brought to all devices that conform to the application standard (the carriage of the frame-packing SEI message for frame-compatible plano-stereoscopic 3DTV video format, where the SEI message is carried for every frame of the video, e.g., as described in ETSI-TS 101 547-2, Digital Video Broadcasting (DVB) Plano-stereoscopic 3DTV; Part 2: Frame compatible plano-stereoscopic 3DTV, handling of recovery point SEI message, e.g., as described in 3GPP TS 26.114 v13.0.0, 3rd Generation Partnership Project; Technical Specification Group Services and System Aspects; IP Multimedia Subsystem (IMS); Multimedia Telephony; Media handling and interaction (Release 13), or use of pan-scan scan rectangle SEI message in DVB, e.g., as described in ETSI-TS 101 154, Digital Video Broadcasting (DVB); Specification for the use of Video and Audio Coding in Broadcasting Applications based on the MPEG-2 Transport Stream.

The tone-mapping information SEI message is used to map luma samples, or each of RGB component samples. Different values of tone_map_id are used to define different purposes, and the syntax of the tone-map SEI message is also modified accordingly. A value of 1 for the tone_map_id allows the SEI message to clip the RGB samples to a minimum and a maximum value. A value of 3 for the tone_map_id allows the signaling of a look up table in the form of pivot points. However, when applied, the same values are applied to all RGB components, or only applied to the luma component.

The knee function SEI message is used to indicate the mapping of the RGB components of the decoded pictures in the normalized linear domain. The input and output maximum luminance values are also indicated, and a look-up table maps the input luminance values to the output luminance values. The same look-up table is applied to all the three color components.

The color remapping information (CRI) SEI message defined in the HEVC standard is used to convey information that is used to map pictures in one color space to another. In one example, the syntax of the CRI SEI message includes three parts—first look-up table (Pre-LUT), followed by a 3×3 matrix indicating color remapping coefficients, followed by a second look-up table (Post-LUT). For each color component, e.g., R, G, B or Y, Cb, Cr, independent LUT is defined for both, Pre-LUT and Post-LUT. The CRI SEI message also includes syntax element called colour_remap_id, different values of which may be used to indicate different purposes of the SEI message.

The dynamic range adjustment SEI message, e.g., as described in D. Bugdayci Sansli, A. K. Ramasubramonian, D. Rusanovskyy, S. Lee, J. Sole, M. Karczewicz, Dynamic range adjustment SEI message, m36330, MPEG meeting, Warsaw, Poland, 22-26 Jun. 2015, has not been adopted as part of any video coding standard; however, the SEI message includes signaling of one set of scale and offset numbers to map the input samples. The SEI message also allows the signaling of different look-up tables for different components, and also allows for signaling optimization when the same scale and offset are to be used for more than one component. The scale and offset numbers are signaled in fixed length accuracy.

Next generation video applications are anticipated to operate with video data representing captured scenery with HDR and WCG. Parameters of the utilized dynamic range and color gamut are two independent attributes of video content, and their specification for purposes of digital television and multimedia services are defined by several international standards. For example, ITU-R Rec. 709 defines parameters for HDTV (high definition television), such as Standard Dynamic Range (SDR) and standard color gamut. On the other hand, ITU-R Rec. 2020 specifies UHDTV (ultra-high definition television) parameters such as high dynamic range (HDR) and wide color gamut (WCG). There are also other standards developing organization (SDOs) documents that specify dynamic range and color gamut attributes in other systems, e.g., P3 color gamut is defined in SMPTE-231-2 (Society of Motion Picture and Television Engineers) and some parameters of HDR are defined in STMPTE-2084. A brief description of dynamic range is provided below.

Dynamic range is typically defined as the ratio between the minimum and maximum brightness of the video signal. Dynamic range may also be measured in terms of 'f-stop,' where one f-stop corresponds to a doubling of the signal dynamic range. In MPEG's definition, HDR content is such content that features brightness variation with more than 16 f-stops. In some terms, levels between 10 and 16 f-stops are considered as intermediate dynamic range, but may be considered HDR in other definitions. At the same time, the human visual system (HVS) is capable of perceiving much larger dynamic range. However, the HVS includes an adaptation mechanism to narrow a so-called simultaneous range.

Current video applications and services are regulated by Rec. 709 and provide SDR, typically supporting a range of brightness (or luminance) of around 0.1 to 100 candelas (cd) per m$^2$ (often referred to as "nits"), leading to less than 10 f-stops. The next generation video services are expected to provide dynamic range of up-to 16 f-stops, and although a detailed specification is currently under development, some initial parameters have been specified in SMPTE-2084 and Rec. 2020.

High dynamic range (HDR) and wide color gamut (WCG) are two attributes of video content. Some example techniques for encoding/decoding HDR/WCG video content use a core video codec (e.g., H.264/AVC or H.265/HEVC) with input bit-depth of 10-bits or more and with additional pre-/postprocessing steps. Pre-processing is applied to the input HDR/WCG video data to make such data conformant to the codec. Postprocessing is applied to the decoded samples to recover the (reconstructed) HDR/WCG video data. Between the pre- and postprocessing there is a standard codec with a bitstream and decoder conforming to a specific profile and level of the standard being executed by the core video codec. In one example, the core video codec is HEVC Main 10.

In some examples, HDR/WCG video content is acquired and stored at a very high precision per component (even floating point), with the 4:4:4 chroma format and a very wide color space (e.g., XYZ). This representation targets high precision and is (almost) mathematically lossless. For compression purposes, a representation with lower precision is preferable, especially when the representation is convenient as input for video codecs like HEVC.

In this manner, destination device 14 represents an example of a device for processing decoded video data that includes a memory configured to store video data of a video bitstream, the video bitstream including a supplemental enhancement information (SEI) message including postprocessing data for the decoded video data; a video decoder implemented by one or more hardware-based processing units comprising digital logic circuitry (e.g., video decoder 30); and a postprocessing unit implemented by one or more hardware-based processing units comprising digital logic circuitry (e.g., video postprocessor unit 31). The video decoder may be configured to decode the video data, extract the HDR postprocessing data from the SEI message, and provide the decoded video data and the HDR postprocessing data to the postprocessing unit. The postprocessing unit may be configured to process the decoded video data using the HDR postprocessing data.

Figure 2:
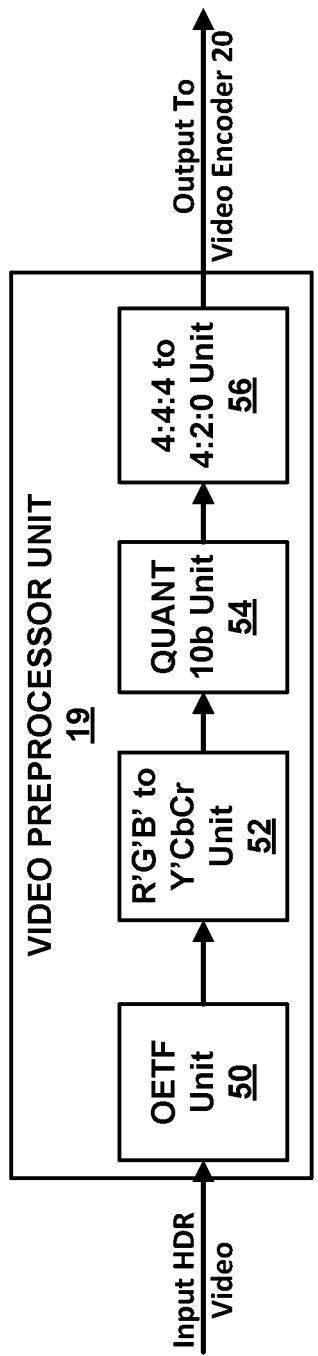
FIG. 2 is a block diagram illustrating an example of an encoding process for HDR content from the linear high precision representation to the compressed bitstream.
Figure 3:
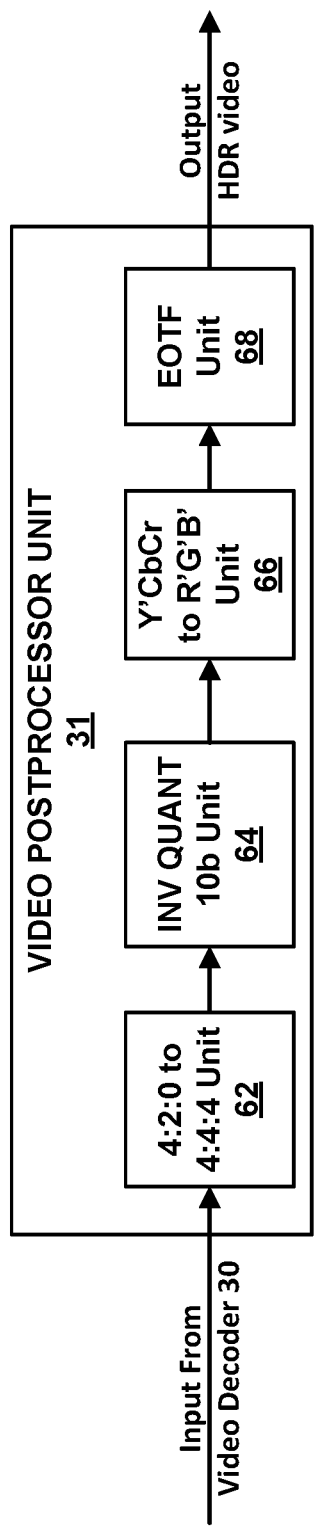
FIG. 3 is a block diagram illustrating an example of a decoding process for HDR content.

FIG. 2 is a block diagram illustrating components of video preprocessor unit 19 of FIG. 1, which may convert HDR content from the linear high precision representation to a format used when encoding video data to form a compressed bitstream. FIG. 3 is a block diagram illustrating components of video postprocessor unit 31 of FIG. 1, which may convert the decompressed video data back to the original representation space (i.e., HDR video).

Video preprocessor unit 19 of FIG. 2 includes OETF unit 50, while video postprocessor unit 31 of FIG. 3 includes EOTF unit 68. OETF unit 50 and EOTF unit 68 implement respective Transfer Functions (TFs). OETF unit 50 converts linear floating data with an opto-electrical transfer function (OETF) from the luminance representation (e.g., in nits, or in normalized luminance representation) to code words (or code levels). The TF may be a one-dimensional (1-D) function. The standard dynamic range (SDR) TF is typically a gamma function. For HDR, other non-linear functions like PQ (ST 2084) may be used, in addition or in the alternative. The goal of the transfer function is to compand the input data accounting for human visual system (HVS) characteristics, which have a perception more aligned with a log-function of the luminance (as opposed to a linear relationship).

Figure 4:
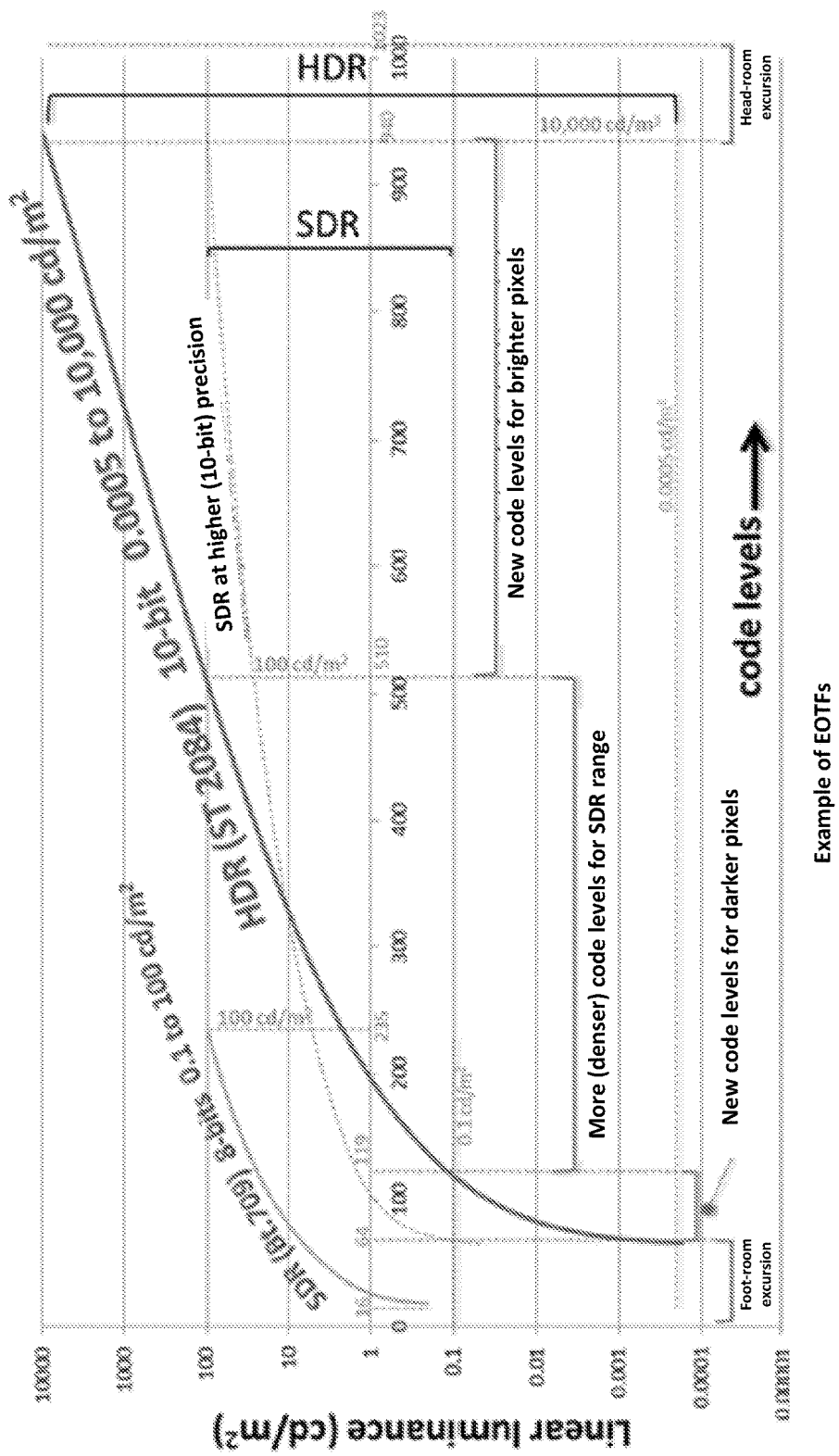
FIG. 4 is a conceptual diagram illustrating several examples of transfer functions.

EOTF unit 68 of FIG. 3 performs the inverse process of the OETF, that is, the EOTF (electro-optical transfer function). By performing the EOTF, EOTF unit 68 maps the code levels back to luminance. FIG. 4 below illustrates several examples of TFs. These mappings may also be applied to each R, G and B component separately.

Video preprocessor unit 19 of FIG. 2 includes R'G'B' to Y'CbCr unit 52, while video postprocessor unit 31 of FIG. 3 includes Y'CbCr to R'G'B' unit 66, each of which performs a respective color transform. The RGB color space has high correlation among its components. In the example of FIG. 2, R'G'B' to Y'CbCr unit 52 converts the RGB components to YCbCr, which is a more uncorrelated color space that is suitable for compression. Likewise, Y'CbCr to R'G'B' unit 66 converts the YCbCr components to respective RGB components, which can be displayed by, e.g., display device 32 (FIG. 1).

Quantization ("quant") 10b unit 54 of FIG. 2 and inverse quantization ("inv quant") 10b unit 64 of FIG. 3 perform respective quantization/fix point conversions. Quant 10b unit 54 converts the original data at high bit-depth (floating or fixed point) to a bit-depth that can be handled by the video codecs, e.g., video encoder 20 and video decoder 30. For example, quant 10b unit 54 may scale the data and quantize the scaled data to be represented with 10-bits, so as to code the data with HEVC 10-bit encoding. Conversely, inv quant 10b unit 64 inverse quantizes and scales the data to reproduce a full bit range.

Video preprocessor unit 19 includes 4:4:4 to 4:2:0 unit 56, which performs down-sampling, while video postprocessor unit 31 includes 4:2:0 to 4:4:4 unit 62, which performs up-sampling. Many video coding applications have been using the 4:2:0 chroma format, since it is generally the case that down-sampling the chroma components by 2 on each direction doesn't have subjective visual impact, while the amount of data is already divided by a factor of 2 before codec compression. For HDR/WCG, that observation still seems to hold, and in the initial systems the codec is fed video represented in a 4:2:0 chroma format. In this way, HEVC Main 10 profile might be used to compress HDR/WCG video.

Figure 5:
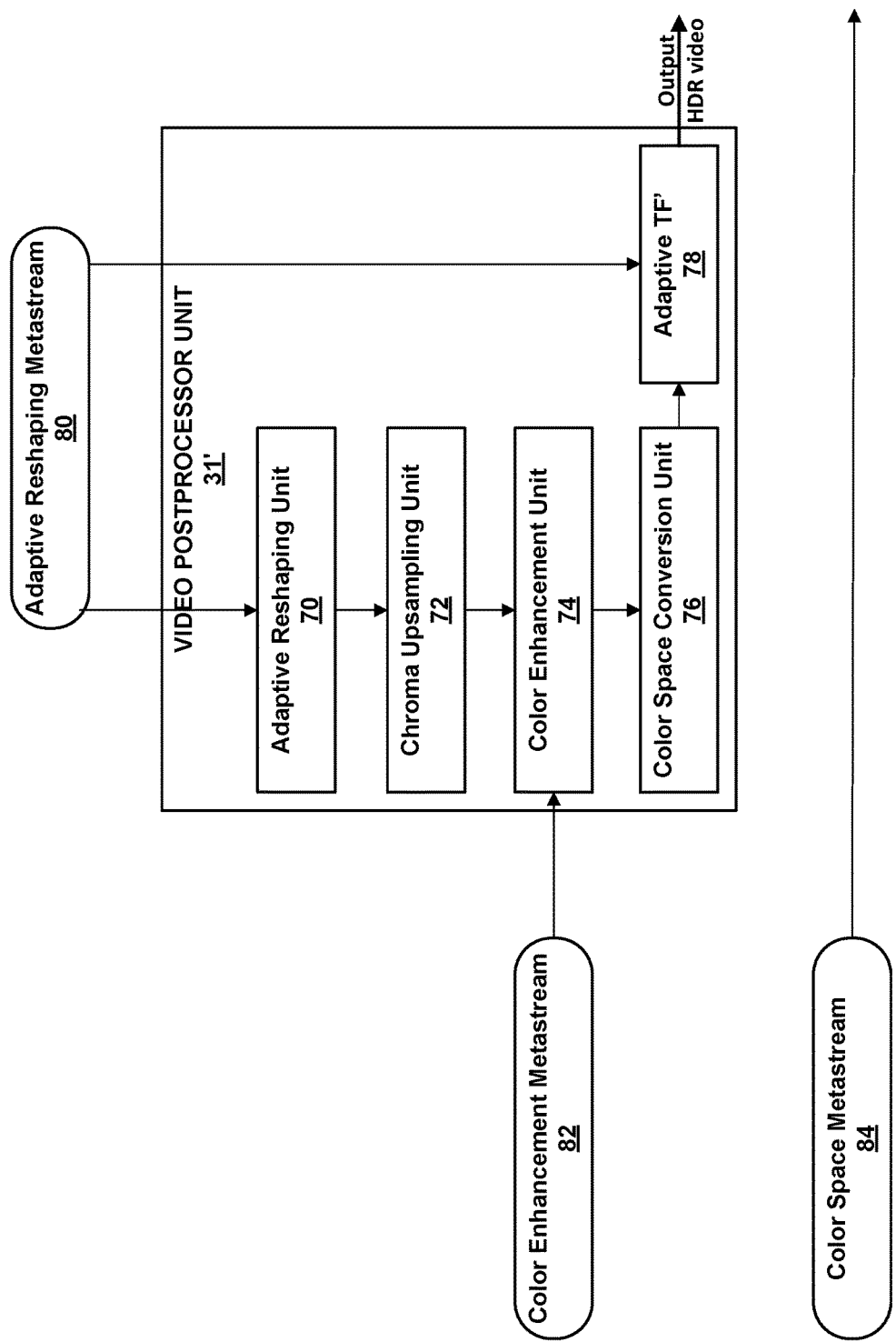
FIG. 5 is a block diagram illustrating an example single-layer HDR reconstruction process in accordance with the techniques of this disclosure.

FIG. 5 is a block diagram illustrating another example video postprocessor unit 31', which performs an alternative coding chain compared to the example of FIG. 3. In this example, video postprocessor unit 31' includes adaptive reshaping unit 70, chroma upsampling unit 72, color enhancement unit 74, color space conversion unit 76, and adaptive TF' 78. Video postprocessor unit 31' also receives metadata including adaptive reshaping metastream 80, color enhancement metastream 82, and color space metastream 84.

As described in the MPEG Ad Hoc group on HDR/WCG (w15454), there are a series of 'common architectures' for HDR. FIG. 5 represents an example common architecture for HDR. Chroma up sampling unit 72 is not necessarily part of the technology for HDR. The HDR output data may be expressed in floating point values. In some examples of the disclosure, an inverse quantization step may be used with the architecture shown in FIG. 5, e.g., as shown in FIG. 3.

Conformance in Video Coding Standards. A video decoder is tested for conformance by delivering a conforming bitstream to the decoder and to the hypothetical reference decoder (HRD) and comparing the values and timing or order of the output of the two decoders. A decoder is said to conform to the AVC or HEVC specification, for example, when all cropped decoded pictures output by the HRD are also output by the decoder under test. That is, the values of all samples that are output are equal to the values of the samples produced by the specified decoding process. Conformance guarantees the quality of the decoded video. The decoded video is 'bit-exact' to the HRD.

The conformance point in example video coding standards (MPEG-1, MPEG-2, H.261, H.263, AVC, HEVC . . . ) has been the HRD output buffer of reconstructed coded frames (with the appropriate chroma format at an integer bit depth) and their timing implied by the HRD model or the higher level STD (MPEG-2 Transport streams). There has not been a conformance model with a 4:2:0 video codec at the core that includes a conformance point on the video signal prior to 4:2:0 (such as a 4:4:4 source) or anything other than the post loop filter 4:2:0 output.

Converting from the 4:4:4 chroma format to a 4:2:0 chroma format and back employs down- and up-sampling filters. The performance of this process can be sensitive to the selected down- and up-sampling filters and to the content characteristics. Adaptive scaling methods are used to change the filters depending on the local characteristics of the content, so that the scaling performs well for each type of region, e.g., on smooth areas, edges, textures, etc. Many manufacturers use proprietary methods to obtain the best quality for their devices (TV, monitors, etc.) and as a way to differentiate from competitors. Therefore, video coding standards do not impose any specific up-sampling filters that shall be applied at the decoder/receiver side. At most, there is the example of the 'Chroma Resampling Hint SEI (supplemental enhancement information)', which is the HEVC/AVC carriage for SMPTE RP-2050 that is a recommendation that defines a method of 4:2:2/4:2:0 and 4:2:0/4:2:2 format conversion to provide non-degraded 4:2:0 chroma protection in concatenated operations.

However, the up-sampling filters to be applied to the 4:2:0 decoded samples should be defined in order to have conformance for HDR system as defined here, since the input and output are in the 4:4:4 chroma format. This poses a problem on how to standardize an HDR video compression system that has to define conformance points for the decoders compliant to the standard.

Another aspect is the floating point operations, which are generally avoided in standards because they are very dependent on the specific architecture. For example, MPEG-1 and 2 define an inverse DCT in floating point (IEEE 1180) that caused drift on decoders that could not use the specified floating point operations. A statistically-oriented standard, ANSI/IEEE 1180-1990, specified the accuracy for a compliant 8×8 IDCT (inverse discrete cosine transform). The drift caused departure from the expected output and quality could not be guaranteed. MPEG-1 required a maximum number of frames between I-frames due to, among others, the accumulation of inverse DCT errors in low-precision implementations most common in hardware decoders. ANSI/IEEE 1180-1990 has not been popular, including being twice administratively withdrawn, notwithstanding that the standard has been continuously referenced by the MPEG family of standards until the fixed-point inverse DCT was defined for video decoding.

In this respect, requiring floating points operations in the video coding standard can be problematic, as it imposes a high bar of precision on all the implementation of the standard. HDR, as defined herein in some examples, has an inverse quantization step from 10-bits to floating point, and then the data is processed in the floating point domain (e.g., inverse TF, color conversion).

Figure 6:
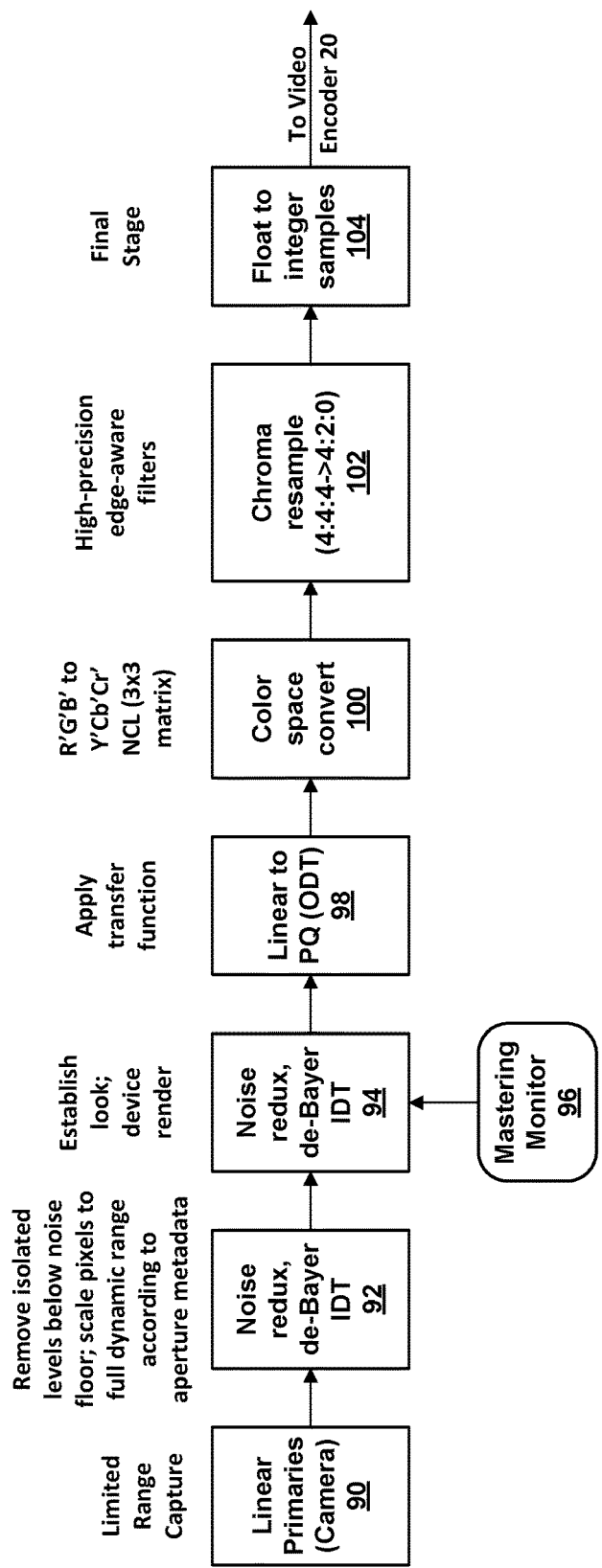
FIG. 6 is a block diagram illustrating example HDR pre-processing techniques.

FIG. 6 is a flow diagram illustrating an example HDR pre-process, which may essentially be performed by, e.g., video preprocessing unit 19 of FIGS. 1 and 2. In the example of FIG. 6, initially, a camera (such as video source 18 of FIG. 1) captures linear primary values in a limited range (90). Video preprocessor unit 19 may then perform a noise reduction and de-Bayer input device transform (IDT) (92), which may remove isolated level values below a defined noise floor and scale pixel values to a full dynamic range according to camera aperture metadata. Video preprocessor unit 19 may then perform a color timing and grading process, which may include, for example, a look modification transform (LMT), a reference rendering transform (RRT), or the like (94). To perform the color timing and grading process, video preprocessor unit 19 may receive data from mastering monitor 96. In general, this process establishes a desired look and performs a device-level rendering.

Next, OETF unit 50 of video preprocessing unit 19 may perform the OETF, which may include converting the linear input data according to a PQ curve via an output device transform (ODT) (98), e.g., as shown in FIG. 4. Then, R'G'B' to Y'CbCr unit 52 may convert the input R'G'B' data to Y'CbCr data using a color space conversion (100). 4:4:4 to 4:2:0 unit 56 may then perform chroma resampling to reduce the 4:4:4 input data to 4:2:0 data (102). Video preprocessing unit 19 may then convert floating point values to integer samples (104).

Alternative implementations could conduct a postprocessing chain in fixed point arithmetic which would approximate accuracy of the floating point operations. In such solutions, the inverse quantization of the data to floating point representation may be avoided if a floating-point output is not required, or may be located at the end of the processing chain, if such output is required.

International standardization bodies (e.g., MPEG) do not appear to have specified implementation of the postprocessing chain, e.g., processing for SEI messages, or precision of its implementations. This may lead to situations where a device which claims to be compliant to a certain standardization specification would provide inadequate quality of service due to fact that implementation of postprocessing was conducted at an insufficient accuracy of representation.

There are two main issues relating to defining conformance points to specific profiles and levels of an HDR standard using a core video codec:

1. Chroma up-sampling filters
2. Floating point operations

This disclosure describes techniques that may be used to overcome these issues in order to define conformance points. In particular, this disclosure describes several techniques that address the issues above, thus allowing specification of an HDR standard using postprocessing and a core codec (e.g., HEVC Main 10). It should be understood that the techniques of this disclosure may be used with other core codecs. Also, it should be understood that each of the techniques described below may be used independently, or may be used in any combination with any other combination of techniques described below.

HDR-conformant bitstreams. A bitstream is said to be conforming to a certain HDR-profile at level L and tier T if it satisfies the following conditions:

The bitstream is compatible with HEVC Main 10 at level L and tier T

The bitstream contains a first SEI message that specifies the look-up table coefficients that specify how the three components (e.g., RGB, YCbCr, YUV, etc.) of the directed decoded samples are mapped.

In one example, a first SEI message is specified as one among, but not limited to, the following list: component scaling SEI message, colour remapping information SEI, dynamic range adjustment SEI message, and the implementation of the look-up table is specified by the semantics of the SEI message as applied directly on the output of the decoded pictures.

In another example, the bitstream is said to be conforming to certain HDR profiles based on the presence of a second, third and fourth SEI message that specify variables related to upsampling, colour conversion and application of an inverse transfer function. Several alternatives of the profiles of HDR conformant decoders are given below.

HDR-conformant decoders. A decoder that is said to conform to a HDR profile for a certain level L and tier T shall decode all bitstreams that are conforming to HDR profile of level L and tier T and provide identical output (in terms of pixel values of the cropped output pictures that are mapped using the look-up table) as the output of a HRD of a HEVC Main 10 compliant decoder that has been mapped using the look-up table specified by the first SEI message.

Figure 7:
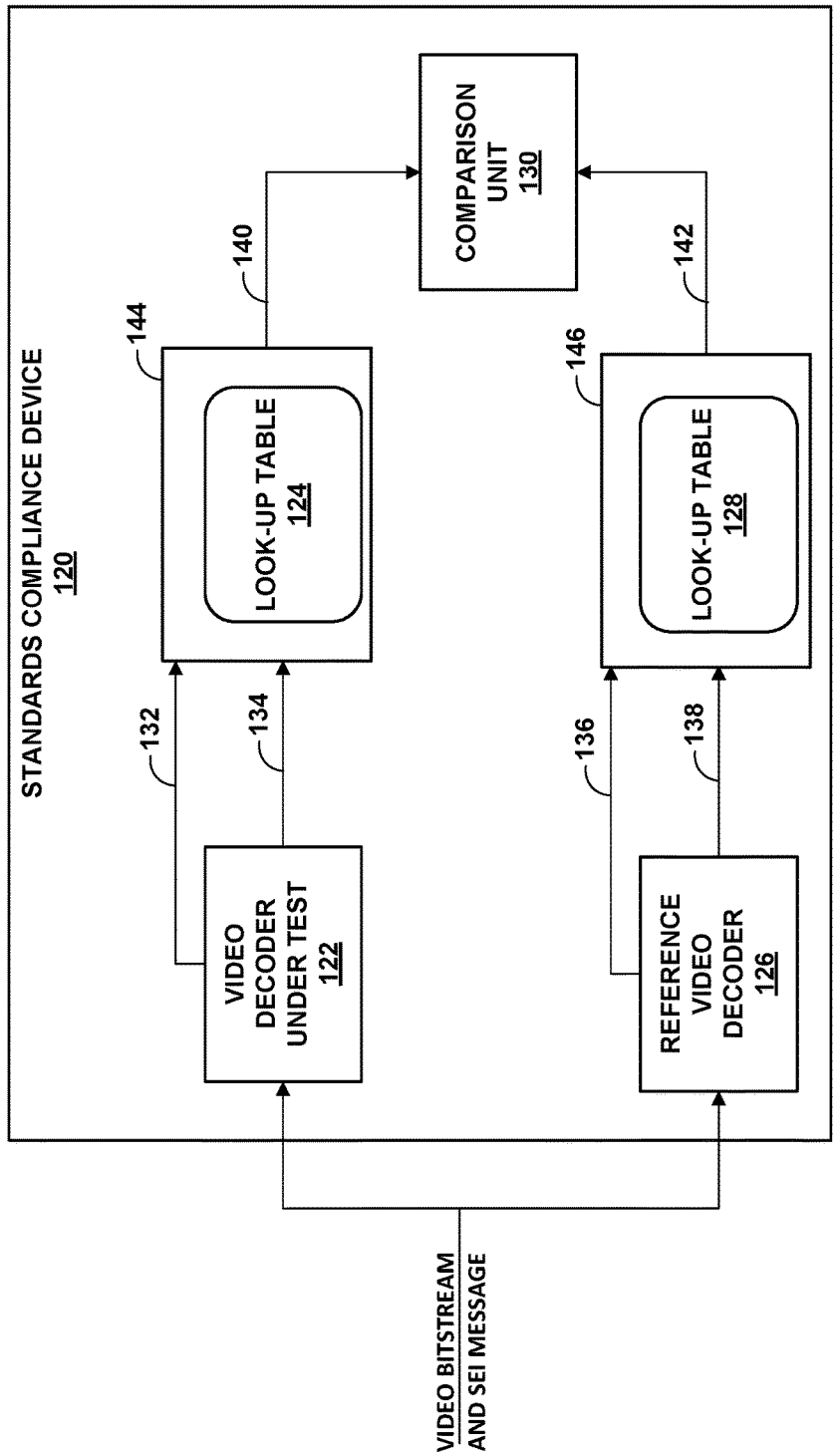
FIG. 7 is a conceptual diagram illustrating how a decoder that claims conformance to a particular profile is tested.

FIG. 7 is a block diagram illustrating an example standards compliance device that determines whether a video decoder under test 122 complies with a particular video coding standard, or a particular profile of a video coding standard. To conform, a video decoder must decode a video bitstream for a particular video coding standard (potentially also for a particular profile of the video coding standard, such as an HDR profile of HEVC), and in doing so, produce the same sample values for each pixel position in the output pictures after postprocessing using a look-up table as obtained after application of the look-up table to the output of a reference video decoder (e.g., the HRD).

In this example, standards compliance device 120 includes video decoder under test 122, postprocessing unit 144 including look-up table 124, reference video decoder 126, postprocessing unit 146 including look-up table 128, and comparison unit 130. Although shown within a single standards compliance device 120, it should be understood that in other examples, video decoder under test 122, reference video decoder 126, and comparison unit 130 may correspond to separate devices.

In this example, video decoder under test 122 and reference video decoder 126 both receive the same input. Reference video decoder 126 represents a model video decoder for a particular video coding standard. Both video decoder under test 122 and reference video decoder 126 receive a video bitstream including an SEI message including postprocessing data. The SEI message may include, for example, upsampling coefficients to be used to upsample 4:2:0 format video data to a 4:4:4 format.

In this example, video decoder under test 122 decodes video data of the received video bitstream. Video decoder under test 122 passes decoded video data 134 (which may also be cropped) to postprocessing unit 144. In addition, video decoder under test 122 extracts the postprocessing data from the SEI message and passes postprocessing data 132 to postprocessing unit 144. Postprocessing unit 144 constructs look-up table 124 using postprocessing data 132, and then postprocesses decoded video data 134 using look-up table 124, forming postprocessed decoded video data under test 140.

Similarly, reference video decoder 126 decodes video data of the received video bitstream. Reference video decoder 126 passes decoded video data 138 (which may also be cropped) to postprocessing unit 146. In addition, reference video decoder 126 extracts the postprocessing data from the SEI message and passes postprocessing data 136 to postprocessing unit 146. Postprocessing unit 146 constructs look-up table 128 using postprocessing data 136, and then postprocesses decoded video data 138 using look-up table 128, forming reference postprocessed decoded video data 142.

Comparison unit 130 then compares postprocessed decoded video data under test 140 to reference postprocessed decoded video data 142. In some examples, this comparison may include determining whether pixels of pictures and picture output orders of postprocessed decoded video data under test 140 and reference postprocessed decoded video data 142 match identically. In some examples, this comparison may allow for a certain margin of error (e.g., a predefined threshold error) between pixels of pictures of postprocessed decoded video data under test 140 and reference postprocessed decoded video data 142. In any case, comparison unit 130 may determine that of postprocessed decoded video data under test 140 matches reference postprocessed decoded video data 142 when, e.g., pixels of pictures and picture output orders of postprocessed decoded video data under test 140 and reference postprocessed decoded video data 142 match identically, or are within a certain degree of tolerance (e.g., per the predefined threshold error discussed above). Thus, standards compliance device 120 may determine that video decoder under test 122 is compliant with the relevant video coding standard for which reference video decoder 126 is a model video decoder.

Figure 8:
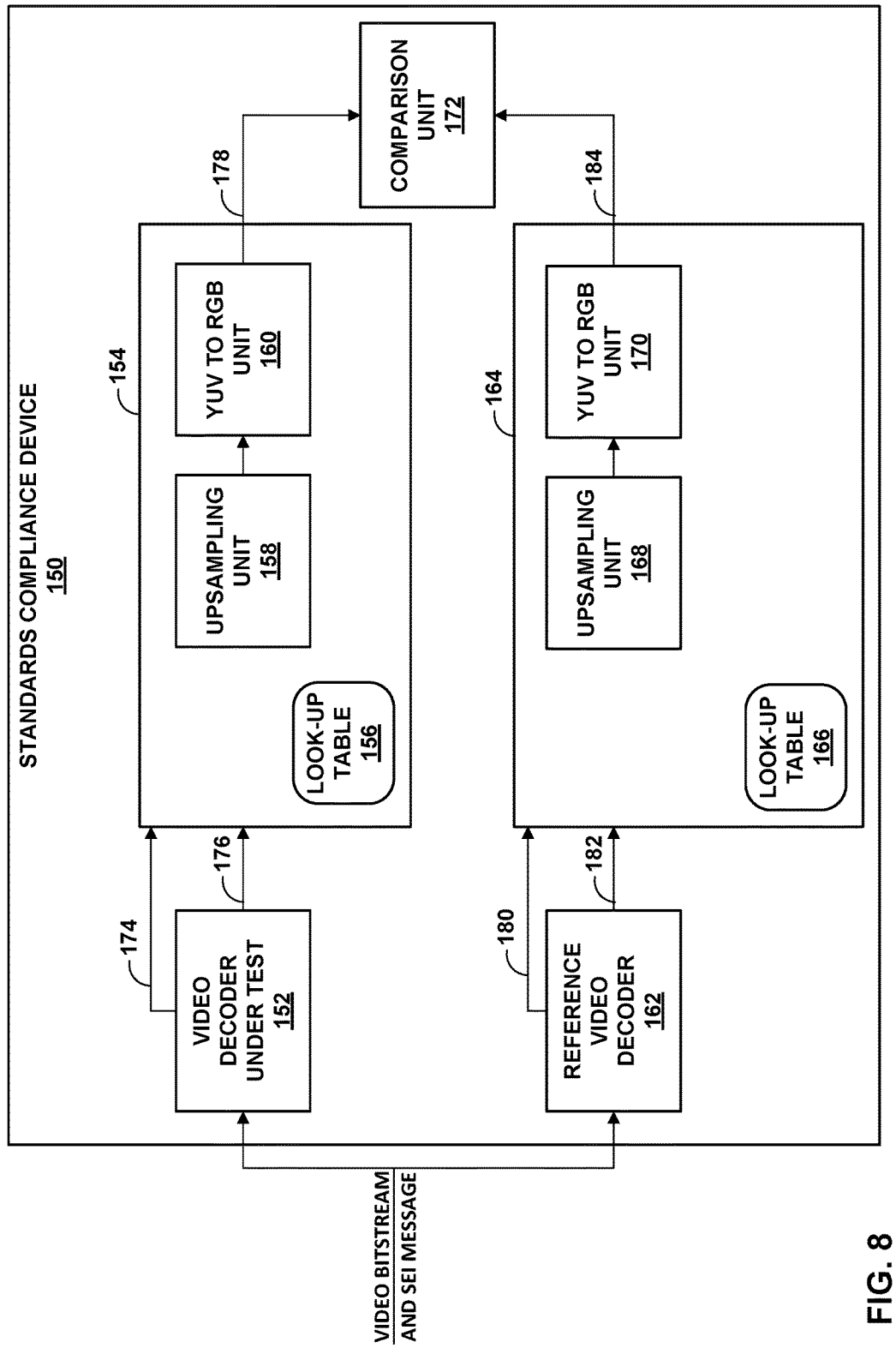
FIG. 8 is a conceptual diagram illustrating another example of how a decoder that claims conformance to a particular profile is tested.

FIG. 8 is a block diagram illustrating another example standards compliance device 150 that determines whether a video decoder under test 152 complies with a particular video coding standard, or a particular profile of a video coding standard. To conform, a video decoder must decode a video bitstream for a particular video coding standard (potentially also for a particular profile of the video coding standard, such as the HDR profile of HEVC), and in doing so, produce the same sample values for each pixel position in the output pictures after postprocessing using a look-up table as obtained after application of the look-up table to the output of a reference video decoder (e.g., the HRD).

In this example, standards compliance device 150 includes video decoder under test 152, postprocessing unit 154 including look-up table 156, reference video decoder 162, postprocessing unit 164 including look-up table 166, and comparison unit 172. Although shown within a single standards compliance device 150, it should be understood that in other examples, video decoder under test 152, reference video decoder 162, and comparison unit 172 may correspond to separate devices.

In this example, video decoder under test 152 and reference video decoder 162 both receive the same input. Reference video decoder 162 represents a model video decoder for a particular video coding standard. Both video decoder under test 152 and reference video decoder 162 receive a video bitstream including one or more SEI messages including postprocessing data. The SEI messages may include, for example, upsampling coefficients to be used to upsample 4:2:0 format video data to a 4:4:4 format, inverse quantization data for increasing values to a particular bit depth, and data to be used when converting between color spaces (e.g., from YUV to RGB).

In this example, video decoder under test 152 decodes video data of the received video bitstream. Video decoder under test 152 passes decoded video data 176 (which may also be cropped) to postprocessing unit 154. In addition, video decoder under test 152 extracts the postprocessing data from the SEI messages and passes postprocessing data 174 to postprocessing unit 154. Postprocessing unit 154 constructs look-up table 156 using postprocessing data 174, and then postprocesses decoded video data 176 using look-up table 156. For example, look-up table 156 may store upsampling coefficients that postprocessing unit 154 applies to upsample 4:2:0 video data to 4:4:4 video data. Postprocessing data 174 may also include upsampling data to be used when upsampling individual samples to a particular bit depth (e.g., during inverse quantization). Thus, upsampling unit 158 may apply the upsampling data to the 4:4:4 video data. Moreover, postprocessing data 174 may include coefficients used to convert data in a luminance and chrominance color space (e.g., a YUV color space) to a red-green-blue (RGB) color space. Thus, YUV to RGB unit 160 may apply these coefficients when converting the inverse quantized samples from YUV to RGB, to produce postprocessed decoded video data under test 178.

Similarly, reference video decoder 162 decodes video data of the received video bitstream. Reference video decoder 162 passes decoded video data 182 (which may also be cropped) to postprocessing unit 164. In addition, reference video decoder 162 extracts the postprocessing data from the SEI message and passes postprocessing data 180 to postprocessing unit 164. Postprocessing unit 164 constructs look-up table 166 using postprocessing data 180, and then postprocesses decoded video data 182 using look-up table 166. For example, look-up table 166 may store upsampling coefficients that postprocessing unit 164 applies to upsample 4:2:0 video data to 4:4:4 video data. Postprocessing data 180 may also include upsampling data to be used when upsampling individual samples to a particular bit depth (e.g., during inverse quantization). Thus, upsampling unit 168 may apply the upsampling data to the 4:4:4 video data. Moreover, postprocessing data 180 may include coefficients used to convert data in a luminance and chrominance color space (e.g., a YUV color space) to a red-green-blue (RGB) color space. Thus, YUV to RGB unit 170 may apply these coefficients when converting the inverse quantized samples from YUV to RGB, to produce reference postprocessed decoded video data 184.

Comparison unit 172 then compares postprocessed decoded video data under test 178 to reference postprocessed decoded video data 184. In some examples, this comparison may include determining whether pixels of pictures and picture output orders of postprocessed decoded video data under test 178 and reference postprocessed decoded video data 184 match identically. In some examples, this comparison may allow for a certain margin of error (e.g., a predefined threshold error) between pixels of pictures of postprocessed decoded video data under test 178 and reference postprocessed decoded video data 184. In any case, comparison unit 172 may determine that of postprocessed decoded video data under test 178 matches reference postprocessed decoded video data 184 when, e.g., pixels of pictures and picture output orders of postprocessed decoded video data under test 178 and reference postprocessed decoded video data 184 match identically, or are within a certain degree of tolerance (e.g., per the predefined threshold error discussed above). Thus, standards compliance device 150 may determine that video decoder under test 152 is compliant with the relevant video coding standard for which reference video decoder 162 is a model video decoder.

Further profiles of HDR may be defined based on additional steps that are specified to test the conformance points. For instance, a decoder conformant to a certain profile of HDR shall produce the same sample values as generated by a HRD of video codec followed by the steps that include, but not limited to, look-up table, up-sampling, colour conversion, inverse quantization, and application of EOTF.

There are several features that are desirable for various HDR profiles, and also define some HDR profiles. One or more of these features may be included independently or in combination for the specification of a profile.

Figure 9:
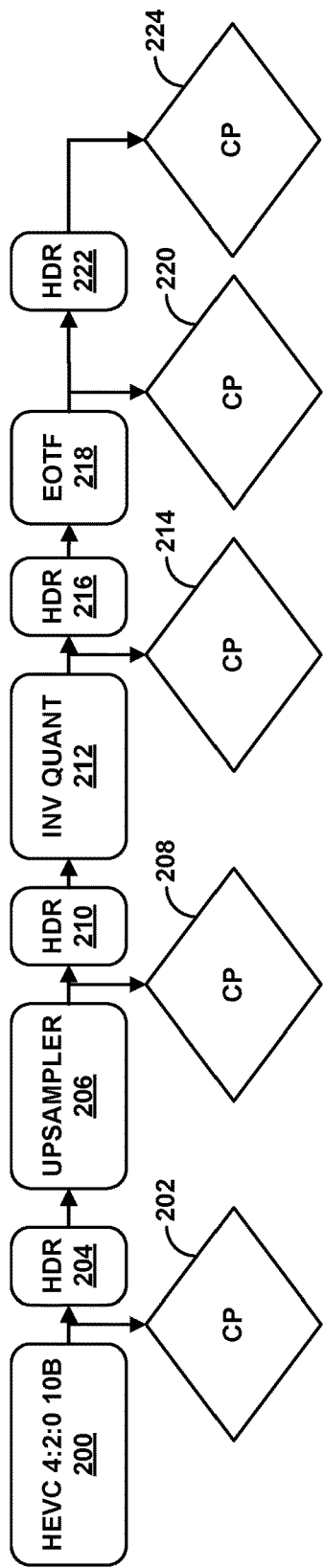
FIG. 9 is a conceptual diagram illustrating another example of how a decoder that claims conformance to a particular profile is tested with multiple conformance points (CPs).

1. Nested HDR conformance points: more than one conformance points are defined in different parts of the HDR chain and decoders can be conformant to one or multiple point(s) in the chain:
   For example, FIG. 9 is a conceptual diagram of a process including multiple conformance points (CPs). In this example, there is an HEVC decoding process 200. The first conformance point (CP 202) is defined right after the HEVC decoding process 200. The second CP 208 is after the 4:2:0 to 4:4:4 upsampling process 206 (which itself accepts HDR data 204). The third CP 214 is after an inverse quantization process 212, which operates on HDR data 210. The last conformance point, CP 220, is defined at the end of the chain following EOTF process 218, which operates on HDR data 216 (in the 4:4:4, RGB, floating point domain). The result of EOTF process 218 is HDR data 222, which may be said to conform if this data matches reference data at CP 224 (and all other conformance points have been passed).

Then, a decoder is conforming to the HDR profile up to one of multiple point(s) in the chain. In FIG. 9, the decoder is conformed at CP 202 if the output is the same as the HRD output right after the decoder. A decoder has complete conformance (end-to-end) if it generates the same output as HRD data 222 at the end of the postprocessing chain (CP 224 in FIG. 9). The conformance tests for nested conformance is easily extendable from the examples shown in FIG. 7 and FIG. 8.

Therefore, a decoder that conforms to a particular HDR profile at a given tier and level correctly decodes all bitstreams conforming to the tier, level or profile and produces numerically identical cropped decoded output pictures at (a) certain conforming point(s); the decoder is not necessarily using the specified decoding process after the specified point(s), neither does it produce numerically identical cropped decoded output pictures to those produced by the process specified herein after the conforming point(s).

2. Some alternatives refer to (standardize) a floating point standard (e.g. IEEE 754-2008) for floating point arithmetic and up-sampling filters in the HEVC specification (or other specifications) for the steps subsequent to the decoder.

Alternatively, the up-sampling filters signaled in an SEI message (e.g. resample filter hint SEI message) is used to define conformance.

3. Core HDR: HDR postprocessing is defined in the decoder output bit-depth domain (or output bit-depth plus some amount), in the same color space and in the same chroma format.

Postprocessing (e.g., adaptive reshaping or dynamic range adjustment, color management) specified decoder output domain.

Color conversion and TF is signaled in the VUI: these steps could be done in the floating point domain, but not part of the standard itself with a conforming point.

Conversion from 4:2:0 to 4:4:4 not standardized: Up-sampling filter remains undefined in this process, that is, not part of the standard.

In this way, the current conformance definition would remain unchanged from the HEVC (or other codec) conformance, except perhaps for additional processing that does not change the output bit depth, colour space or chroma format.

4. Like 2, but force the color transform to be in the codec output bit-depth

For example, using the YCgCo color space able to operate in fixed-integer accuracy almost without losses.

5. Conditional conformance for the 4:2:0 to 4:4:4 conversion
   a) HDR HEVC recommends an up-sampling filter (or signaled using the 'Chroma Resampling Hint SEI')
   b) The conformance is conditioned to the decoder using the filter in a) above.
   c) If that filter is used, the decoder output should match the HRD output (conformance).
   d) However, the usage of the filter is not required ('should' instead of 6. Approximate conformance for HDR, in which the decoder (including normative postprocessing) output is not bit-exact but within a range of the HRD output
   'Within range' of the HRD output is defined in terms of relative error or absolute error in the output domain. In some alternatives, an additional step is included to convert the floating data to integer/fixed-point domain (maybe applying again a TF) and the conformance is assessed at that next point.
   This is possible because the HDR output is not fed back to the decoder (no feedback loop of the decoded errors) so there would be no drift.

7. The semantics of the postprocessing chain (e.g. semantics of the processes defined by the SEI messages) is changed to be in the fixed point arithmetic and target bit depth. In this way, a conformance point can be assured.

8. Standardize a look-up table for each component at the output that will be applied directly on the cropped decoded pictures. The coefficients needed to specify the look up table are signaled as part of the metadata or an SEI message, and the look-up process is defined as defined by the semantics of the SEI message or the metadata. Alternatively, the look-up table for each component is applied on cropped decoded pictures after the application of processes specified by a second SEI message.

Combinations of one or more of the above solutions are possible. For example, the up-sampling filter could be fixed, but approximate conformance still required due to the floating point arithmetic of some of the remaining processing blocks.

Figure 10:
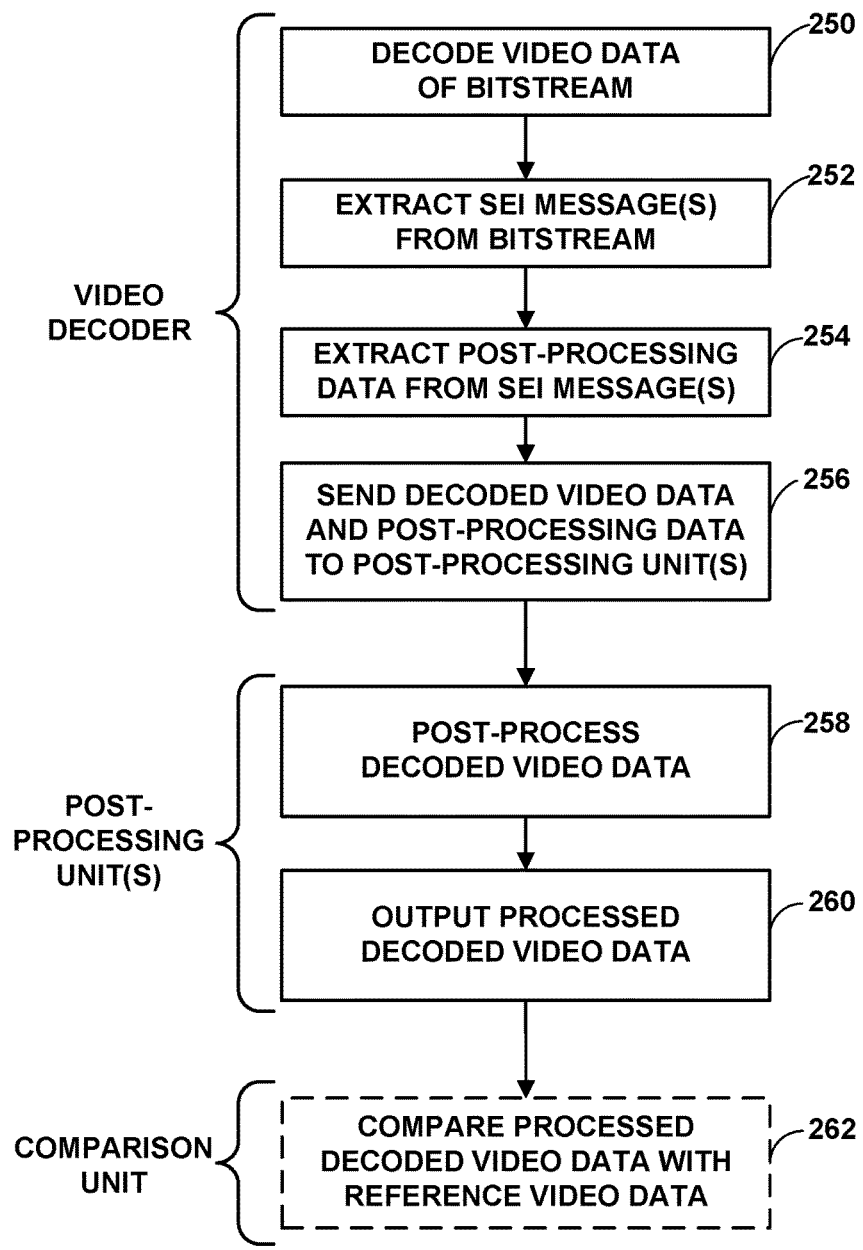
FIG. 10 is a flowchart illustrating an example method in accordance with the techniques of this disclosure.

FIG. 10 is a flowchart illustrating an example method in accordance with the techniques of this disclosure. The method of FIG. 10 may be performed by, for example, destination device 14 of FIG. 1, standards compliance device 120 of FIG. 7, or standards compliance device 150 of FIG. 8. For purposes of example, the method of FIG. 10 is explained with respect to destination device 14 of FIG. 1 and the various example components thereof (e.g., as discussed with respect to FIGS. 3 and 5)

Initially, video decoder 30 decodes video data of a bitstream (250). It is presumed, in this example, that the bitstream includes one or more SEI messages that specify postprocessing data. For example, the bitstream may include one or more of a component scaling SEI message, a color remapping information SEI, or a dynamic range adjustment SEI message, or other such SEI messages including additional or alternative postprocessing data. Video decoder 30 also extracts the SEI messages from the bitstream (252) and extracts the postprocessing data from the SEI messages (254). Video decoder 30 then sends the decoded video data and the postprocessing data to one or more postprocessing units, such as video postprocessor unit 31 (FIG. 1) (256).

Video postprocessor unit 31 then postprocesses the decoded video data (258) using the postprocessing data received from video decoder 30. For example, video postprocessor unit 31 (in particular, 4:2:0 to 4:4:4 unit 62 of FIG.

3) may upsample the decoded video data from a 4:2:0 chroma format to a 4:4:4 chroma format using the postprocessing data (e.g., extracted from a component scaling SEI message). Additionally or alternatively, inverse quantization 10b unit 64 of FIG. 3 may add precision to (that is, inverse quantize) the pixel values of the decoded video data using the postprocessing data (e.g., extracted from a dynamic range adjustment SEI message. Additionally or alternatively, Y'CbCr to R'G'B' Unit 66 may convert the video data from a luminance and chrominance color space (e.g., Y'CbCr) to a red-green-blue (RGB) color space, e.g., using the postprocessing data (which may be extracted from a color remapping information SEI message). Additionally or alternatively, EOTF unit 68 may execute an EOTF function on the decoded video data using the postprocessing data. Video postprocessor unit 31 may then output the processed decoded video data (260).

Furthermore, the output processed decoded video data may be tested to determine whether the video decoder (e.g., video decoder 30, in this example) complies with an applicable video decoding standard. In particular, steps 250-260 of FIG. 10 may be performed by a video decoder under test, such as video decoders under test 122, 152 of FIGS. 7, 8, respectively. In addition, steps 250-260 of FIG. 10 may also be performed by a reference video decoder, such as reference video decoders 126, 162 of FIGS. 7, 8, respectively. Then, a comparison unit, such as comparison unit 130, 172 of FIGS. 7, 8, respectively, may compare the outputs of the video decoder under test with the output of the reference video decoder (262) to determine whether the outputs match. The comparison may be performed at any of a variety of conformance points, such as CPs 202, 208, 214, 220, and/or 224 of FIG. 9. The comparison unit may determine one or more of the conformance points to which the video decoder under test is said to conform, based on whether the output of the video decoder under test matches the corresponding output of the reference video decoder at that conformance point. The box around step 262 is illustrated using a dashed line to indicate that this step is optional, as the techniques of this disclosure may also be applied during the normal course of video decoding and postprocessing, and are not necessarily limited to scenarios in which the output is tested for conformance with a standard.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of processing decoded video data, the method comprising:
  decoding, by a video decoder under test, video data of a video bitstream according to a video coding standard, the video bitstream including a supplemental enhancement information (SEI) message including high dynamic range (HDR) postprocessing data for the decoded video data, the decoded video data comprising decoded video data under test;

extracting, by the video decoder under test, the HDR postprocessing data from the SEI message;

providing, by the video decoder under test, the decoded video data and the HDR postprocessing data to a postprocessing unit under test;

processing, by the postprocessing unit under test, the decoded video data under test using the HDR postprocessing data according to the video coding standard;

decoding, by a reference decoder, the video data of the video bitstream to form reference decoded video data, the reference decoder conforming to the video coding standard;

processing, by a reference postprocessing unit, the reference decoded video data using the HDR postprocessing data to form reference processed decoded video data; and determining that the video decoder under test and the postprocessing unit under test conform to the video coding standard when the processed decoded video data under test matches the reference processed decoded video data.

2. The method of claim 1, wherein the HDR postprocessing data comprises look-up table coefficients for upsampling the decoded video data, and wherein processing the decoded video data comprises upsampling, by the postprocessing unit, the decoded video data using the look-up table coefficients.

3. The method of claim 2, wherein the SEI message comprises a Chroma Resampling Hint SEI message.

4. The method of claim 1, wherein the HDR postprocessing data comprises inverse quantization data for inverse quantizing the decoded video data, and wherein processing the decoded video data comprises inverse quantizing, by the postprocessing unit, the decoded video data using the inverse quantization data.

5. The method of claim 1, wherein the HDR postprocessing data comprises color transformation data for transforming the decoded video data from a luminance and chrominance color space to a red-green-blue color space, and wherein processing the decoded video data comprises transforming, by the postprocessing unit, the decoded video data from the luminance and chrominance color space to the red-green-blue color space using the color transformation data.

6. The method of claim 1, wherein the HDR postprocessing data comprises transfer function data defining an electro-optical transfer function on the decoded video data, and wherein processing the decoded video data comprises executing, by the postprocessing unit, the electro-optical transfer function on the decoded video data.

7. The method of claim 1, wherein processing the decoded video data under test comprises at least one of upsampling the decoded video data under test, inverse quantizing the decoded video data under test, transforming the decoded video data under test from a luminance and chrominance color space to a red-green-blue color space, or executing an electro-optical transfer function on the decoded video data on the decoded video data under test.

8. The method of claim 1, further comprising determining that the processed decoded video data under test matches the reference processed decoded video data when the processed decoded video data under test has values within a predetermined range of corresponding values of the reference processed decoded video data.

9. The method of claim 1, wherein the postprocessing unit under test comprises a first postprocessing unit under test of a plurality of postprocessing units under test, wherein the reference postprocessing unit comprises a first reference postprocessing unit of a plurality of reference postprocessing units, each of the postprocessing units under test corresponding to one of the reference postprocessing units, wherein postprocessing, by the first postprocessing unit under test, the decoded video data under test further comprises postprocessing, by each of the postprocessing units under test, the decoded video data under test using the HDR postprocessing data according to the video coding standard, wherein postprocessing, by the first reference postprocessing unit, further comprises postprocessing, by each of the reference postprocessing units, the reference video data using the HDR postprocessing data, and wherein determining that the video decoder under test and the postprocessing unit under test conform to the video coding standard comprises determining that the video decoder under test and each of the postprocessing units under test conform to the video coding standard when the processed decoded video data under test output by each of the postprocessing units under test matches the reference processed decoded video data output by the corresponding reference postprocessing units.

10. A system for processing decoded video data, the system comprising:

a memory configured to store video data of a video bitstream, the video bitstream including a supplemental enhancement information (SEI) message including high dynamic range (HDR) postprocessing data for the video data;

a video decoder under test implemented by one or more hardware-based processing units comprising digital logic circuitry;

a postprocessing unit under test implemented by one or more hardware-based processing units comprising digital logic circuitry, the video decoder under test being configured to:
  decode the video data according to a video coding standard, the decoded video data comprising decoded video data under test;
  extract the HDR postprocessing data from the SEI message; and
  provide the decoded video data under test and the HDR postprocessing data to the postprocessing unit under test, and the postprocessing unit under test being configured to process the decoded video data under test using the HDR postprocessing data according to the video coding standard;

a reference decoder configured to decode the video data of the video bitstream to form reference decoded video data, the reference decoder conforming to the video coding standard;

a reference postprocessing unit configured to process the reference decoded video data using the HDR postprocessing data to form reference processed decoded video data; and a standard compliance unit configured to determine that the video decoder under test and the postprocessing unit under test conform to the video coding standard when the processed decoded video data under test matches the reference processed decoded video data.

11. The system of claim 10, wherein the postprocessing unit comprises a chroma upsampling unit, wherein the HDR postprocessing data comprises look-up table coefficients for upsampling the decoded video data, and wherein the chroma upsampling unit is configured to upsample the decoded video data using the look-up table coefficients.

12. The system of claim 10, wherein the postprocessing unit comprises an inverse quantization unit, wherein the HDR postprocessing data comprises inverse quantization data for inverse quantizing the decoded video data, and wherein the inverse quantization unit is configured to inverse quantize the decoded video data using the inverse quantization data.

13. The system of claim 10, wherein the HDR postprocessing data comprises color transformation data for transforming the decoded video data from a luminance and chrominance color space to a red-green-blue color space, and wherein processing the decoded video data comprises transforming, by the postprocessing unit, the decoded video data from the luminance and chrominance color space to the red-green-blue color space using the color transformation data.

14. The system of claim 10, wherein the HDR postprocessing data comprises transfer function data defining an electro-optical transfer function on the decoded video data, and wherein processing the decoded video data comprises executing, by the postprocessing unit, the electro-optical transfer function on the decoded video data.

15. A system for processing decoded video data, the system comprising:
first decoding means under test for decoding video data of a video bitstream according to a video coding standard, the video bitstream including a supplemental enhancement information (SEI) message including high dynamic range (HDR) postprocessing data for the decoded video data, the decoded video data comprising decoded video data under test;
means for extracting the HDR postprocessing data from the SEI message;
means for providing the decoded video data and the HDR postprocessing data to postprocessing means under test;
the postprocessing means under test for processing the decoded video data under test using the HDR postprocessing data according to the video coding standard;
second decoding means for decoding the video data of the video bitstream to form reference decoded video data, the second decoding means for decoding conforming to the video coding standard;
second postprocessing means for processing the reference decoded video data using the HDR postprocessing data to form reference processed decoded video data; and
means for determining that the first decoding means under test conforms to the video coding standard when the processed decoded video data under test matches the reference processed decoded video data.

16. The system of claim 15, wherein the HDR postprocessing data comprises look-up table coefficients for upsampling the decoded video data, and wherein processing the decoded video data comprises upsampling, by the postprocessing unit, the decoded video data using the look-up table coefficients.

17. The system of claim 15, wherein the HDR postprocessing data comprises inverse quantization data for inverse quantizing the decoded video data, and wherein processing the decoded video data comprises inverse quantizing, by the postprocessing unit, the decoded video data using the inverse quantization data.

18. The system of claim 15, wherein the HDR postprocessing data comprises color transformation data for transforming the decoded video data from a luminance and chrominance color space to a red-green-blue color space, and wherein processing the decoded video data comprises transforming, by the postprocessing unit, the decoded video data from the luminance and chrominance color space to the red-green-blue color space using the color transformation data.

19. The system of claim 15, wherein the HDR postprocessing data comprises transfer function data defining an electro-optical transfer function on the decoded video data, and wherein processing the decoded video data comprises executing, by the postprocessing unit, the electro-optical transfer function on the decoded video data.

20. A computer-readable non-transitory storage medium having stored thereon instructions that, when executed:
cause first one or more processors executing a video decoder under test to:
decode video data of a video bitstream according to a video coding standard, the video bitstream including a supplemental enhancement information (SEI) message including high dynamic range (HDR) postprocessing data for the decoded video data, the decoded video data comprising decoded video data under test;
extract the HDR postprocessing data from the SEI message; and
provide the decoded video data under test and the HDR postprocessing data to a postprocessing unit under test executed by second one or more processors;
cause the second one or more processors executing the postprocessing unit under test to process the decoded video data under test using the HDR postprocessing data according to the video coding standard;
cause third one or more processors executing a reference decoder to decode the video data of the video bitstream to form reference decoded video data, the reference decoder conforming to the video coding standard,
cause fourth one or more processors executing a second postprocessing unit to process the reference decoded video data using the HDR postprocessing data to form reference processed decoded video data; and
cause fifth one or more processors to determine that the video decoder under test conforms to the video coding standard when the processed decoded video data under test matches the reference processed decoded video data.

21. The computer-readable non-transitory storage medium of claim 20, wherein the HDR postprocessing data comprises look-up table coefficients for upsampling the decoded video data, and wherein the instructions that cause the second one or more processors to process the decoded video data comprise instructions that cause the second one or more processors to upsample the decoded video data using the look-up table coefficients.

22. The computer-readable non-transitory storage medium of claim 20, wherein the HDR postprocessing data comprises inverse quantization data for inverse quantizing the decoded video data, and wherein the instructions that cause the second one or more processors to process the decoded video data comprise instructions that cause the second one or more processors to inverse quantize the decoded video data using the inverse quantization data.

23. The computer-readable non-transitory storage medium of claim 20, wherein the HDR postprocessing data comprises color transformation data for transforming the decoded video data from a luminance and chrominance color space to a red-green-blue color space, and wherein the instructions that cause the second one or more processors to process the decoded video data comprise instructions that cause the second one or more processors to transform the decoded video data from the luminance and chrominance color space to the red-green-blue color space using the color transformation data.

24. The computer-readable non-transitory storage medium of claim 20, wherein the HDR postprocessing data comprises transfer function data defining an electro-optical transfer function on the decoded video data, and wherein the instructions that cause the second one or more processors to process the decoded video data comprise instructions that cause the second one or more processors to execute the electro-optical transfer function on the decoded video data.

* * * * *